US012426657B1

(12) United States Patent
Luo

(10) Patent No.: US 12,426,657 B1
(45) Date of Patent: Sep. 30, 2025

(54) CAMERA BRACKET

(71) Applicant: Phicbital(Chongqing) Data Technology Co., Ltd., Chongqing (CN)

(72) Inventor: Ting Luo, Chongqing (CN)

(73) Assignee: Phicbital(Chongqing) Data Technology Co., Ltd., Chongqing (CN)

(*) Notice: Subject to any disclaimer, the term of this patent is extended or adjusted under 35 U.S.C. 154(b) by 0 days.

(21) Appl. No.: 18/963,678

(22) Filed: Nov. 28, 2024

(30) Foreign Application Priority Data

Sep. 30, 2024 (CN) .......................... 202411385470.4

(51) Int. Cl.
G02B 7/08 (2021.01)
A42B 3/04 (2006.01)
F16M 13/04 (2006.01)
G03B 17/56 (2021.01)

(52) U.S. Cl.
CPC .............. *A42B 3/042* (2013.01); *F16M 13/04* (2013.01); *G03B 17/561* (2013.01)

(58) Field of Classification Search
USPC ....................................................... 396/422
See application file for complete search history.

(56) References Cited

U.S. PATENT DOCUMENTS 5,089,914 A * 2/1992 Prescott ................. G02B 23/12
2/5
8,342,758 B2 * 1/2013 Braithwaite ........... A42B 3/042
396/419

FOREIGN PATENT DOCUMENTS

| CN | 104902771 A | * | 9/2015 | ............. A42B 3/042 |
| CN | 205831187 U | * | 12/2016 | |
| CN | 111288056 A | | 6/2020 | |
| CN | 111805194 A | | 10/2020 | |
| CN | 212202752 U | | 12/2020 | |
| CN | 113238429 A | * | 8/2021 | ........... G02B 27/646 |
| CN | 214127222 U | * | 9/2021 | |
| WO | WO-2016078636 A1 | * | 5/2016 | ............... A42B 3/04 |

* cited by examiner

*Primary Examiner* — Walter L Lindsay, Jr.
*Assistant Examiner* — Warren K Fenwick
(74) *Attorney, Agent, or Firm* — George D. Morgan

(57) ABSTRACT

The present invention relates to the technical field of the brackets. The present invention discloses a camera bracket, mounted inside a helmet, including a support connected to the helmet and a frame body for mounting a camera, where when the camera is mounted on the frame body, the camera is located inside the helmet; the support is connected to the frame body through a movably arranged universal head, the frame body rotates relative to the support by using the universal head as a rotation center, the frame body swings relative to the support by using the universal head as a swing center, a swing interval is arranged between the frame body and the support, and the swing interval limits a limit position at which the frame body swings relative to the support.

10 Claims, 11 Drawing Sheets

CAMERA BRACKET

CROSS-REFERENCE TO RELATED APPLICATIONS

The application claims priority to Chinese patent application No. 2024113854704, filed on Sep. 30, 2024, the entire contents of which are incorporated herein by reference.

TECHNICAL FIELD

The present invention relates to the technical field of camera brackets, and in particular, to a camera bracket.

BACKGROUND

There are many types of cameras that are widely used in various situations, enabling real-time monitoring, video recording, and the like. In addition, a real-time video call can also be carried out on a network through a camera.

The camera is also widely used in sports, in which case the camera needs to be arranged on a helmet, so that real-time shooting and the like can be performed by using the camera during the movement.

In the prior art, the camera is mounted on the top of the helmet or the bottom of the helmet, and the camera is exposed on the outside of the helmet. In rainy days, rainwater will be directly wet on the camera to shield the shooting view of the camera. In addition, the camera is easily disturbed by an external object, which affects the shooting stability of the camera.

SUMMARY

An objective of the present invention is to provide a camera bracket, so as to solve a problem in the prior art that a camera is mounted outside a helmet.

The present invention is implemented as follows: a camera bracket, mounted inside a helmet, including a support connected to the helmet and a frame body for mounting a camera, where when the camera is mounted on the frame body, the camera is located inside the helmet;

the support is connected to the frame body through a movably arranged universal head, the frame body rotates relative to the support by using the universal head as a rotation center, the frame body swings relative to the support by using the universal head as a swing center, a swing interval is disposed between the frame body and the support, and the swing interval limits a limit position at which the frame body swings relative to the support; and an elastic seat for positioning a position of the universal head is disposed in the support, the elastic seat abuts against the universal head, and is pressed by the universal head to be in a compressed state.

Further, the support is provided with two clamping pieces that are arranged oppositely and elastically swing, a clamping area is formed between the two clamping pieces, and a width of the clamping area gradually reduces along a direction from top to bottom of the support; and the support clamps the helmet oppositely through two clamping pieces and is fixed inside the helmet.

Further, a cushion layer is disposed inside the helmet, the cushion layer is surrounded to form a helmet cavity for a head of a user to wear, the two clamping pieces clamp the cushion layer oppositely, and the support is mounted inside the helmet; and the two clamping pieces include an outer side clamping piece arranged deviating from the helmet cavity and an inner side clamping piece arranged towards the helmet cavity, and the inner side clamping piece is sleeved with a rubber sleeve.

Further, the outer side clamping piece is provided with a plurality of inner side grooves, the inner side grooves are arranged towards the clamping area, the plurality of inner side grooves are arranged at intervals along a length direction of the outer side clamping piece, and the adjacent inner side grooves are arranged in a staggered manner; each inner side groove is provided with a rubber hook made of elastic rubber, one end of the rubber hook is fixed to a side wall of the inner side groove, and the other end of the rubber hook is bent towards the clamping area and extends into the clamping area; and when the outer side clamping piece and the inner side clamping piece clamp the helmet oppositely, the rubber hook is pressed, and is reversely bent and deformed towards the inner side groove, so that the rubber hook is reversely clamped to the helmet.

Further, the support includes a base and a bottom plate, the bottom plate is fixed to the bottom of the base, the swing interval is formed between the base and the frame body, and the base is connected to the frame body through the universal head; and the two clamping pieces are respectively formed on two sides of the bottom plate, and the two clamping pieces are integrally formed with the bottom plate.

Further, side edge walls are respectively formed on the two sides of the bottom plate, and the clamping piece is in butt joint with the side edge wall; and two recessed grooves are formed on the side edge wall, and the two recessed grooves are arranged on two sides of the clamping piece.

Further, a middle hole is disposed in the middle of the base, and the universal head is movably embedded in the middle hole; and the top of the base is provided with a top surface, the top surface is arranged along the middle hole in a surrounding manner, the top surface is arranged obliquely downward along an extending direction of the top surface from inside to outside, and the swing interval is formed between the top surface and the bottom of the frame body.

Further, the universal head includes a ball head, the ball head is convexly provided with a column body, the ball head is movably embedded in the middle hole, and the column body is fixed connected to the frame body; an upper section is formed on an upper portion of the ball head, and a lower section is formed on a lower portion of the ball head; the upper section abuts against an inner side wall of the middle hole, and a lower gap is disposed between the lower section and the inner side wall of the middle hole;

the lower section and the bottom of the middle hole are arranged at intervals; the elastic seat is disposed between the lower section and the bottom of the middle hole, the elastic seat is pressed by the ball head to be in a compression deformation state, and the ball head is reversely pressed by the compressed elastic seat, so as to increase abutting force between the upper section and the inner side wall of the middle hole; and the column body is inserted into the frame body and is fixedly connected to the frame body.

Further, a surface of the lower section is provided with a plurality of groove holes, the plurality of groove holes are arranged at intervals and distributed throughout the surface of the lower section, and the elastic seat is pressed by the ball head to be compressed and deformed, and is movably embedded in the groove holes.

Further, the top of the frame body is recessed downward to form a recessed area, and an annular wall arranged annularly is disposed in the recessed area; a magnetic plate is disposed in the recessed area, and the annular wall surrounds a periphery of the magnetic plate; an annular gap is disposed between the periphery of the magnetic plate and the annular wall, a plurality of elastically deformed deformation blocks are disposed in the annular gap, and the deformation blocks are respectively in butt joint with the periphery of the magnetic plate and the annular wall, and the deformation blocks are in a compression deformation state;

the recessed area is convexly provided with an elastic column, a through hole is disposed in the middle of the magnetic plate, the elastic column penetrates through the through hole, and the elastic column abuts against an inner side wall of the through hole; and the periphery of the elastic column is convexly provided with an elastic ring, the elastic ring presses against the magnetic plate from top to bottom, and the bottom of the recessed area and the elastic ring clamp the magnetic plate oppositely, so that the magnetic plate is elastically fixed in the recessed area.

Compared with the prior art, the camera bracket provided by the present invention can be mounted inside the helmet. The camera is mounted on the frame body, and the camera is also disposed inside the helmet, and the camera is in a built-in state. In rainy days, rainwater will not be directly wet on the camera, the shooting view of the camera is prevented from being shielded, and the camera will not be disturbed by an external object, so that shooting stability of the camera is ensured;

secondly, the frame body can rotate or swing relative to the support to achieve multi-position adjustment of the camera, so as to satisfy diversified shooting requirements of a user; and in addition, after the universal head rotates or swings, the universal head is reversely pressed by the elastic seat, so that the universal head is in an elastic constraint, and therefore, the firmness of a position of the universal head is ensured, the effect of elastic vibration reduction can be achieved, and the stability of the camera is improved.

DETAILED DESCRIPTION OF THE EMBODIMENTS

Figure 1:
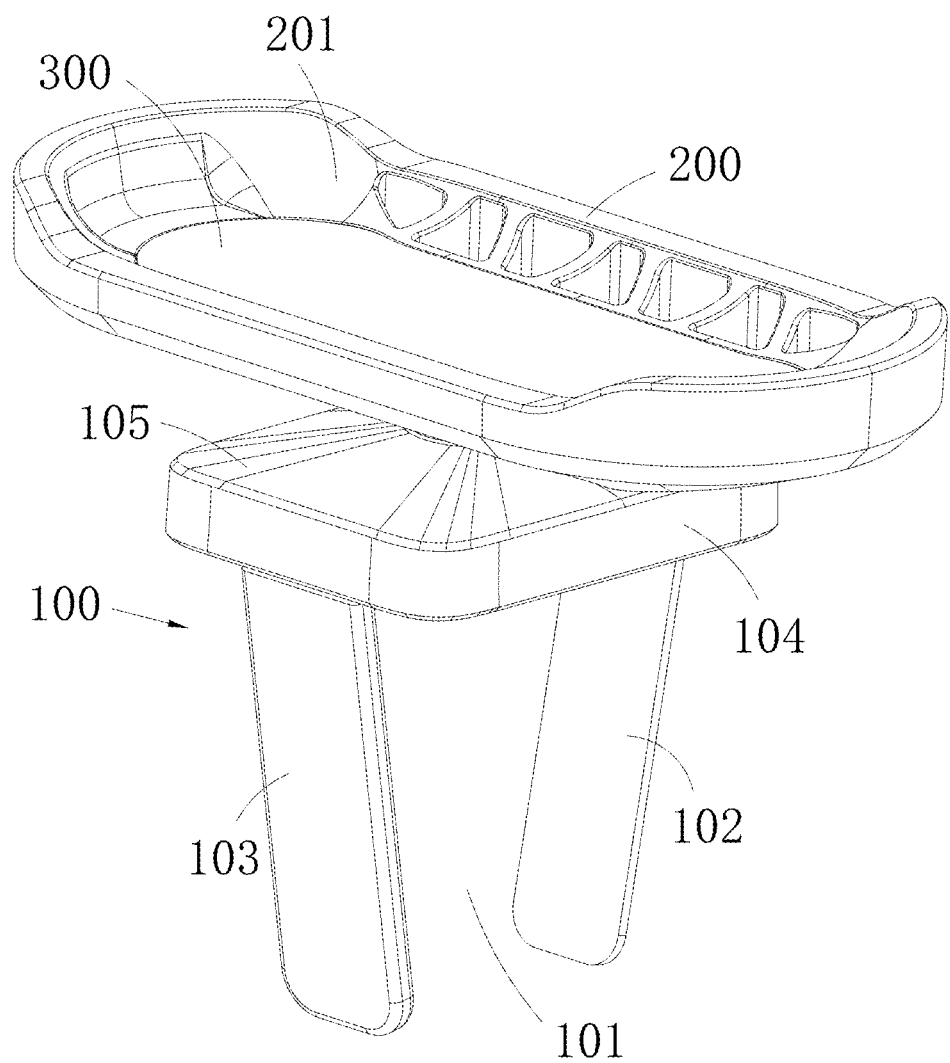
FIG. 1 is a three-dimensional schematic diagram of a camera bracket according to an embodiment of the present invention.
Figure 2:
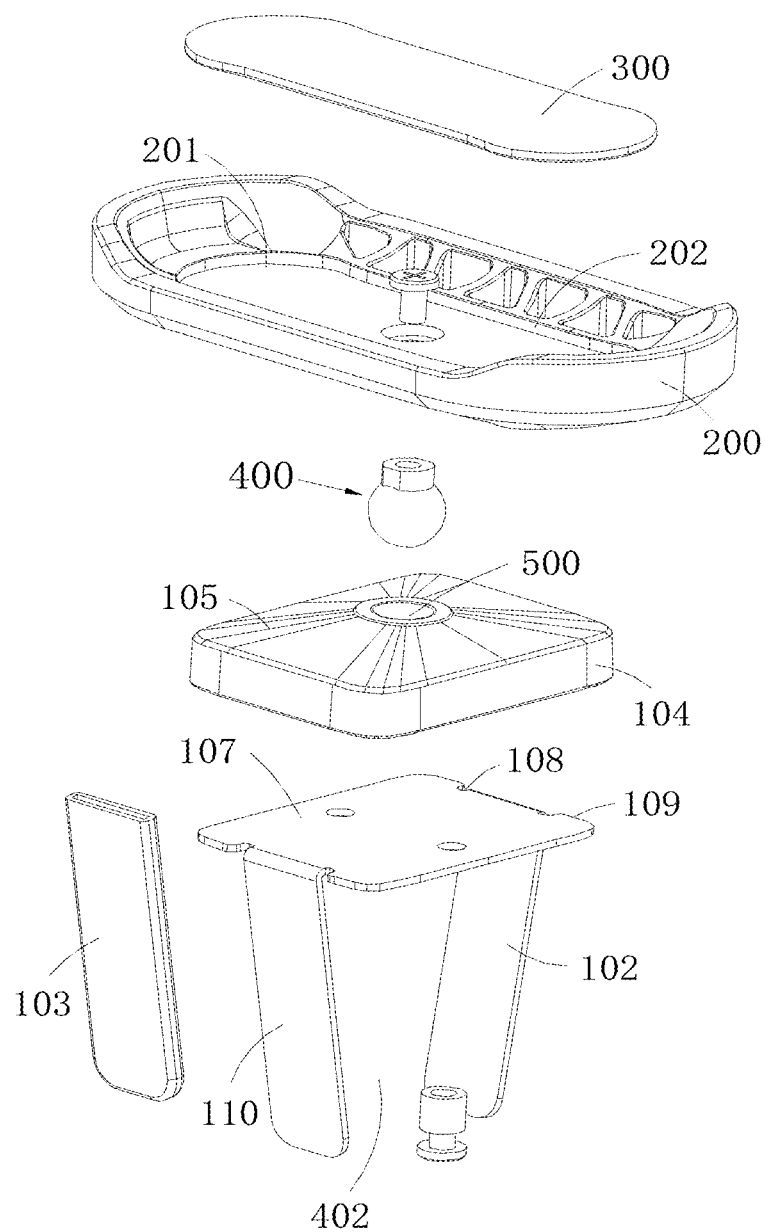
FIG. 2 is an exploded three-dimensional schematic diagram of a camera bracket according to an embodiment of the present invention.
Figure 3:
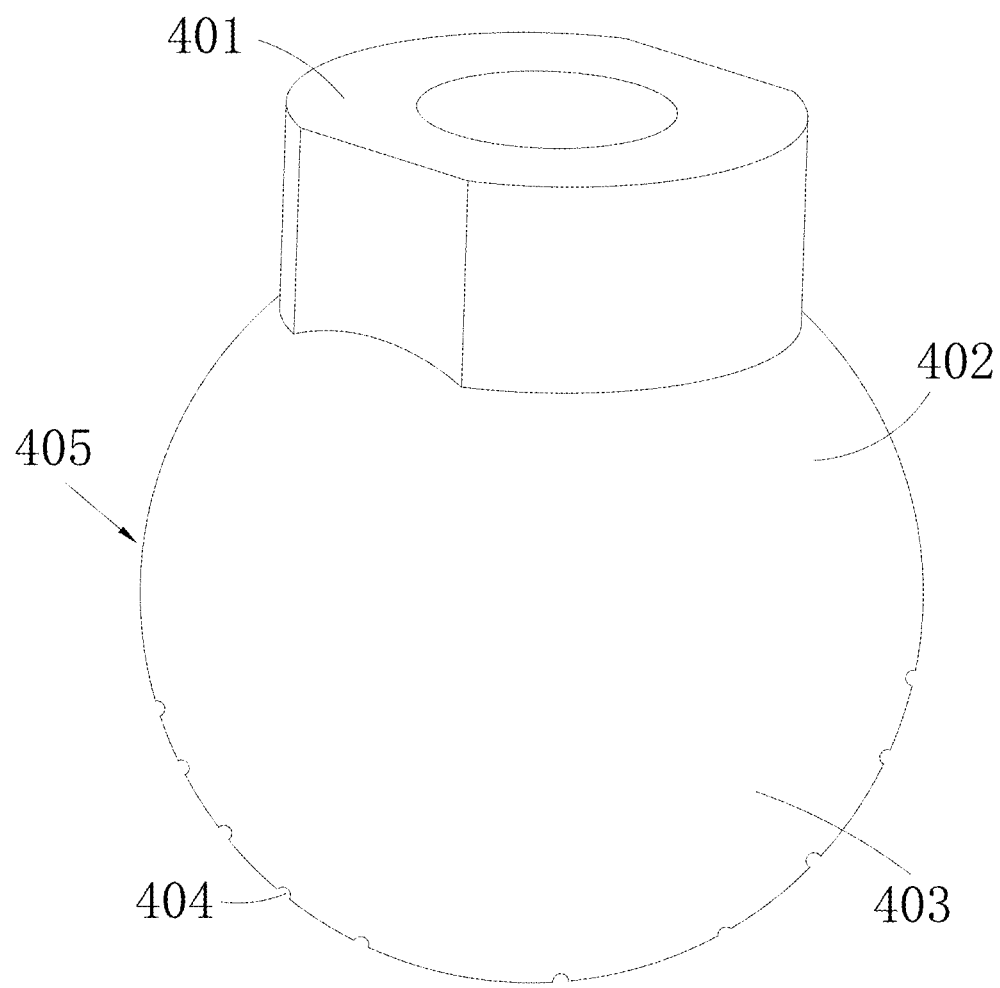
FIG. 3 is a three-dimensional schematic diagram of a universal head according to an embodiment of the present invention.
Figure 4:
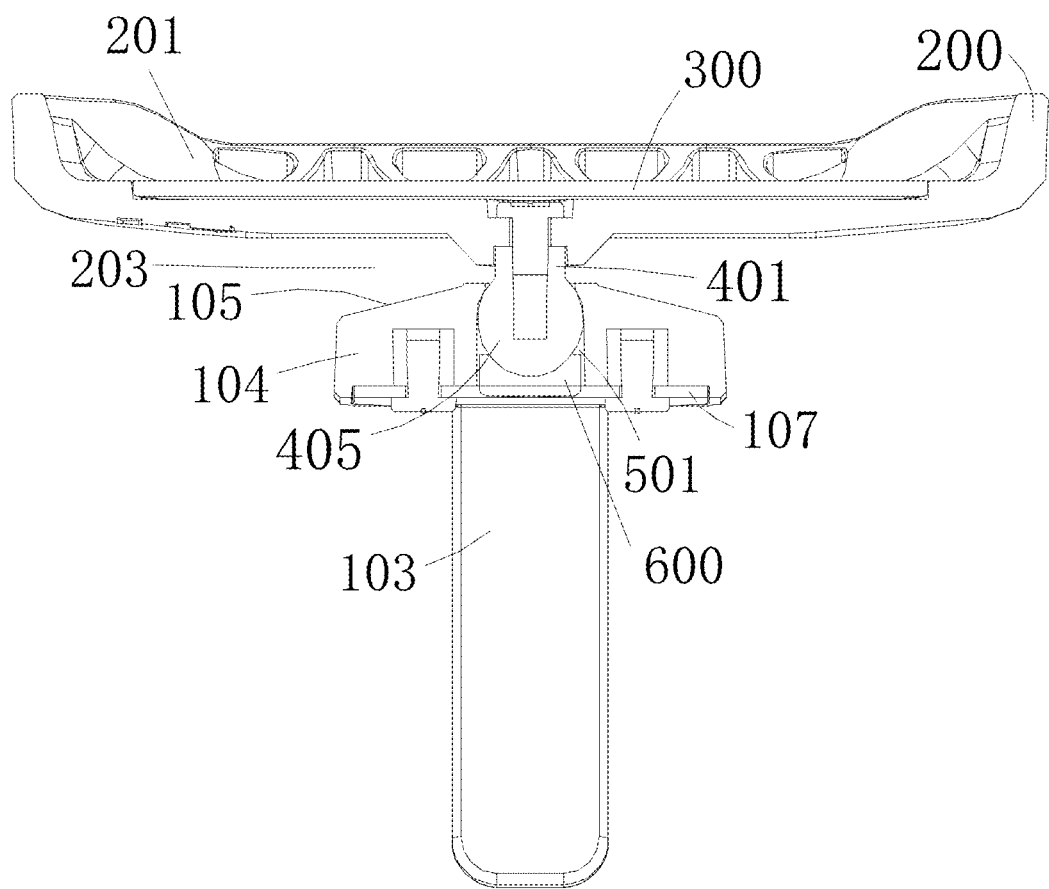
FIG. 4 is a schematic sectional view of a camera bracket according to an embodiment of the present invention.
Figure 5:
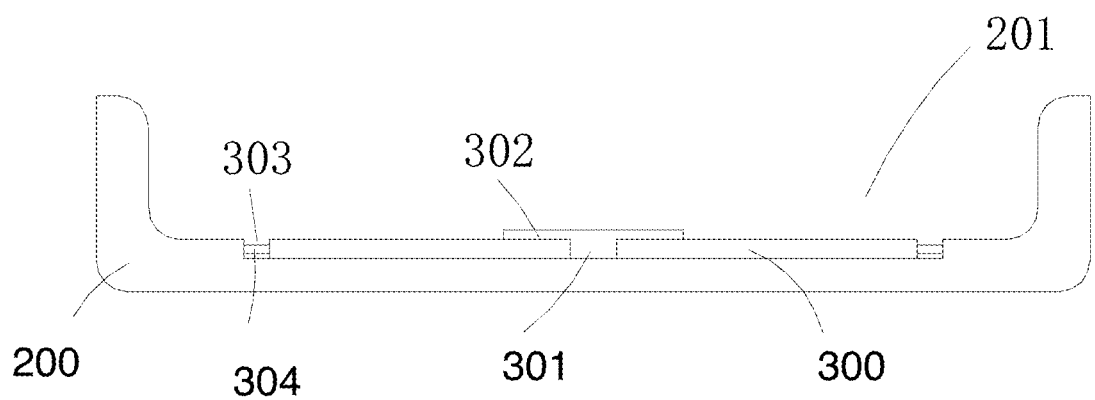
FIG. 5 is a schematic sectional view of cooperation of a frame body and a magnetic plate according to an embodiment of the present invention.
Figure 6:
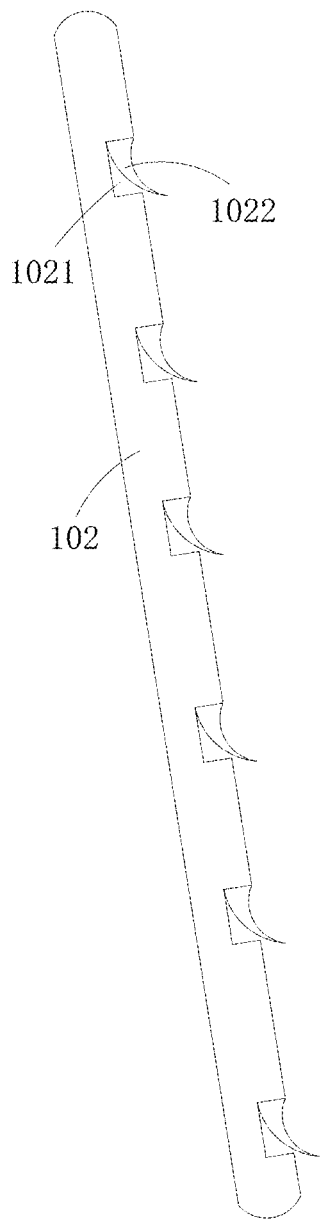
FIG. 6 is a schematic front view of an inner side clamping piece according to an embodiment of the present invention.
Figure 7:
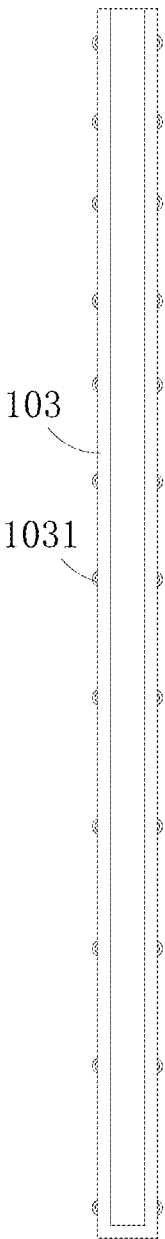
FIG. 7 is a schematic sectional view of a rubber sleeve according to an embodiment of the present invention.
Figure 8:
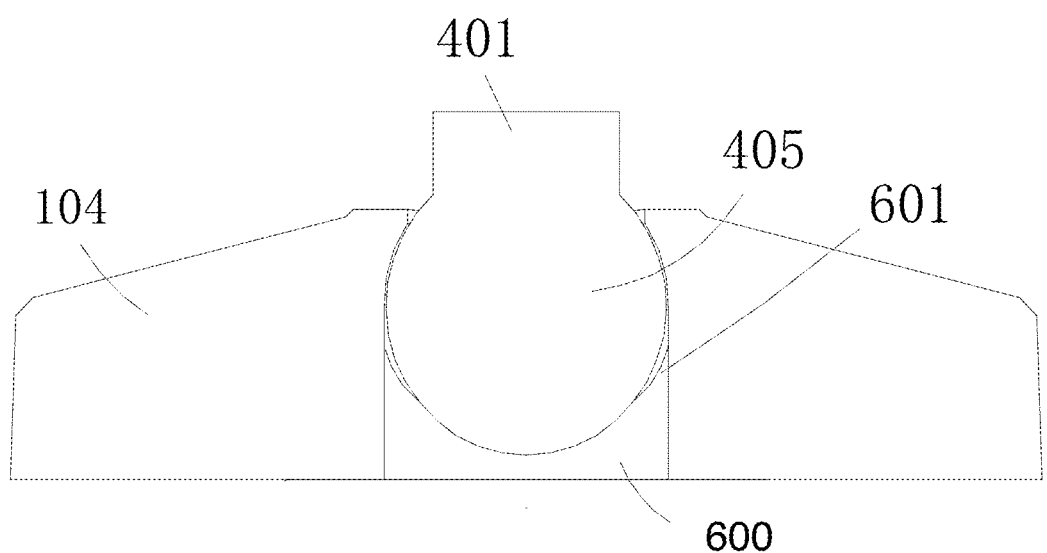
FIG. 8 is a schematic sectional view of cooperation of a universal head and a base according to an embodiment of the present invention.
Figure 9:
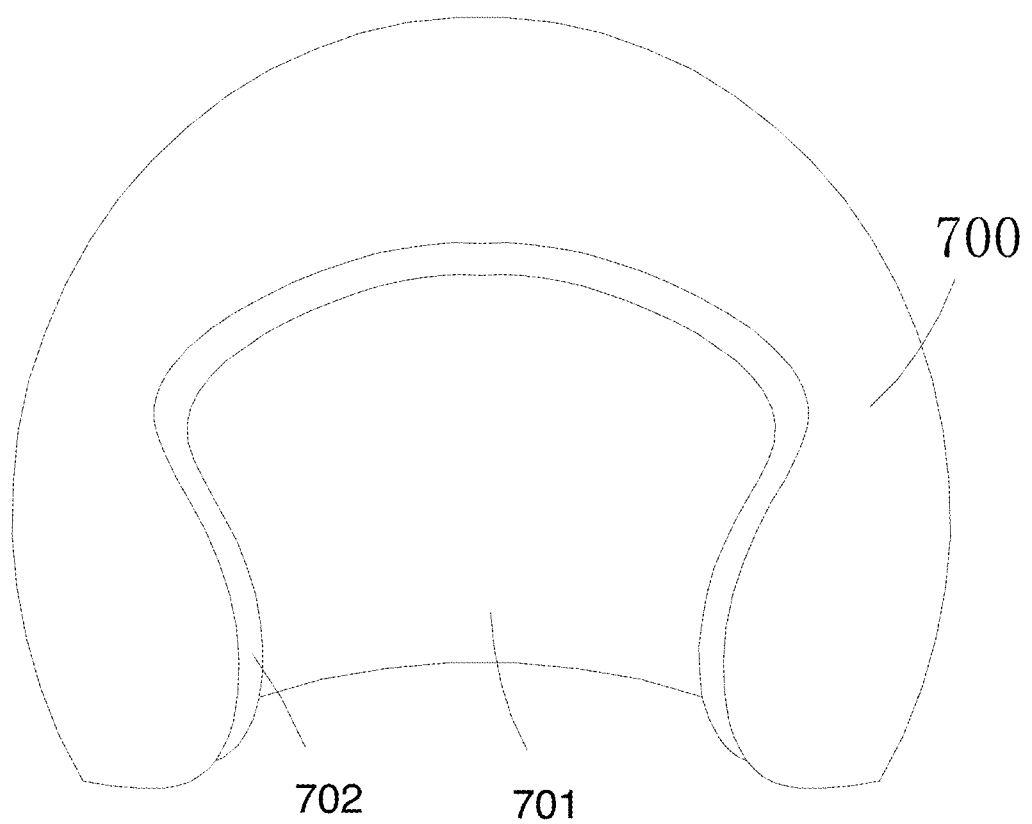
FIG. 9 is a schematic front view of a helmet according to an embodiment of the present invention.

To make the purposes, technical solutions, and advantages of the present invention clearer, the following further describes the present invention in detail with reference to the accompanying drawings and embodiments. It should be understood that, specific embodiments described herein are merely used to explain the present invention but not to limit the present invention.

The implementation of the present invention is described in detail below with reference to specific embodiments.

The same or similar reference numerals in the accompanying drawings of the embodiments correspond to the same or similar parts. In the description of the present invention, it should be understood that if the orientations or positional relationships indicated by the terms "upper", "lower", "left", "right", and the like are in accordance with those shown in the accompanying drawings, and are intended only for the convenience of describing the present invention and simplifying the description rather than for indicating or implying that the referred devices or elements must have a particular orientation or constructed or operated in a particular orientation; and therefore, the terms used to describe the positional relationships in the accompanying drawings are only for illustrative purposes and are not to be construed as limiting the present patent, and the specific meaning of the terms described above will be understood by those of ordinary skill in the art according to the specific circumstances.

FIG. 1 to FIG. 11 show a preferred embodiment of the present invention.

A camera bracket, mounted inside a helmet 700, includes a support 100 connected to the helmet 700 and a frame body 200 for mounting a camera, where when the camera is mounted on the frame body 200, the camera is located inside the helmet 700. The helmet 700 can be of many types, and is worn on a head of a user to protect the head of the user.

The support 100 is connected to the frame body 200 through a movably arranged universal head 400. The "movably arranged" herein refers to that the universal head 400 can move, rotate or swing between the support 100 and the frame body 200.

The frame body 200 rotates relative to the support 100 by using the universal head 400 as a rotation center, the frame body 200 swings relative to the support 100 by using the universal head 400 as a swing center. A swing interval 203 is disposed between the frame body 200 and the support 100, and the swing interval 203 limits a limit position at which the frame body 200 swings relative to the support 100. That is, the size of the swing interval 203 can limit a maximum amplitude at which the frame body 200 swings relative to the support 100.

That is, when the swing interval 203 is relatively large, a swing amplitude of the frame body 200 relative to the support 100 is relatively large, and when the swing interval 203 is relatively small, a swing amplitude of the frame body 200 relative to the support 100 is relatively small.

When the frame body 200 swings to the limit position relative to the support 100, that is, swings to the maximum amplitude, the frame body 200 abuts against the support 100, and in this case, the frame body 200 cannot swing in a greater amplitude relative to the support 100.

An elastic seat 600 for positioning a position of the universal head 400 is disposed in the support 100, the elastic seat 600 abuts against the universal head 400, and is pressed by the universal head 400 to be in a compressed state. When the support 100 is fixed inside the helmet 700 and the user needs to adjust an angle of the camera, the frame body 200 can be swung or rotated relative to the support 100, and in this case, the universal head 400 also swings or rotates accordingly.

When the frame body 200 swings or rotates to a required position, the elastic seat 600 is used for reversely pressing the universal head 400, so that the position of the universal head 400 can be positioned, and the frame body 200 is prevented from shaking relative to the support 100 during the movement.

The camera bracket provided above can be mounted inside the helmet 700. The camera is mounted on the frame body 200, and the camera is also disposed inside the helmet 700, and the camera is in a built-in state. In rainy days, rainwater will not be directly wet on the camera, the shooting view of the camera is prevented from being shielded, and the camera will not be disturbed by an external object, so that shooting stability of the camera is ensured;

secondly, the frame body 200 can rotate or swing relative to the support 100 to achieve multi-position adjustment of the camera, so as to satisfy diversified shooting requirements of a user; and in addition, after the universal head 400 rotates or swings, the universal head 400 is reversely pressed by the elastic seat 600, so that the universal head 400 is in an elastic constraint, and therefore, the firmness of a position of the universal head 400 is ensured, the effect of elastic vibration reduction can be achieved, and the stability of the camera is improved.

In this embodiment, the support 100 is provided with two clamping pieces that are arranged oppositely and elastically swing, and a clamping area 101 is formed between the two clamping pieces. The two clamping pieces can swing away from each other elastically, so that the two clamping pieces perform clamping operation.

A width of the clamping area 101 gradually reduces along a direction from top to bottom of the support 100, facilitating clamping of the helmet 700 by the two clamping pieces, and satisfying the diversified clamping and fixing of the two clamping pieces on the helmet 700; and the support 100 clamps the helmet 700 oppositely through the two clamping pieces and is fixed inside the helmet 700.

When the two clamping pieces swing away from each other, the clamping pieces have an elastic force that elastically swings towards the clamping area 101, so that the two clamping pieces clamp the helmet 700 oppositely, and the support 100 is fixedly mounted inside the helmet 700.

Alternatively, in another embodiment, the support 100 may also be mounted inside the helmet 700 in an insertion manner, or mounted inside the helmet in other diversified manners, as long as the support 100 can be mounted inside the helmet 700.

Figure 10:
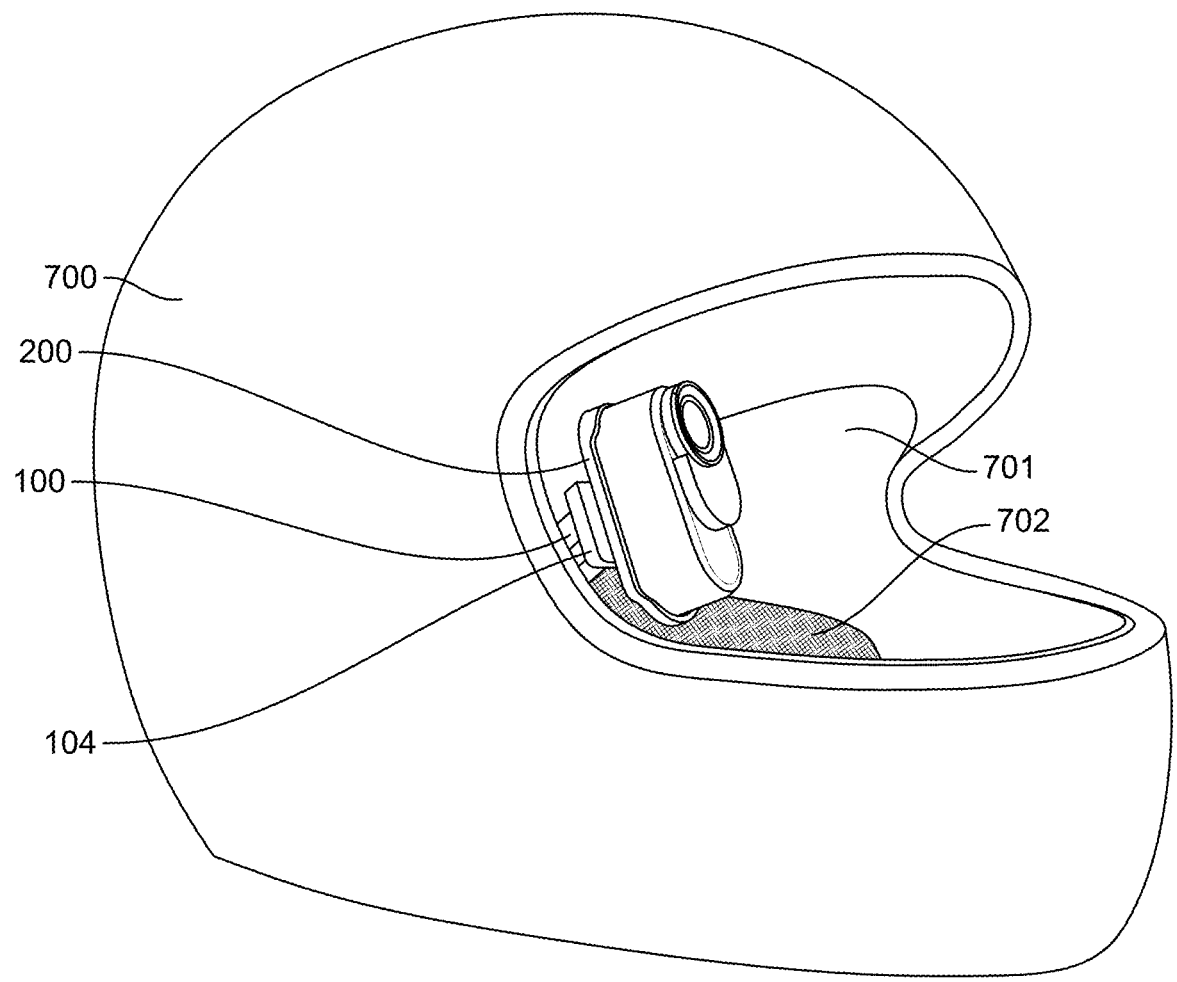
FIG. 10 illustrates a helmet mounted with a camera bracket according to an embodiment of the present invention.
Figure 11:
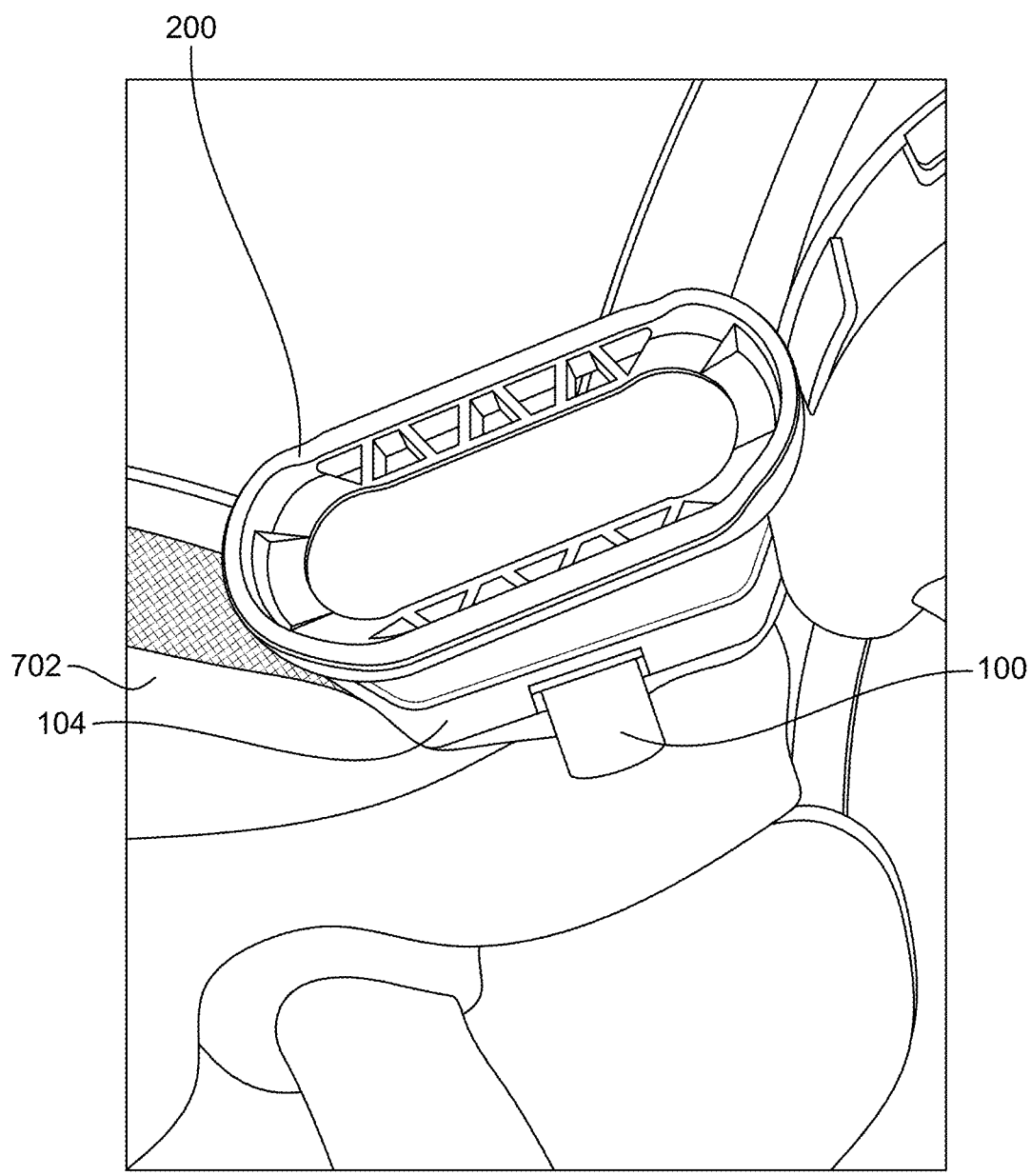
FIG. 11 illustrates a cut out portion a helmet mounted with a camera bracket according to an embodiment of the present invention.

In this embodiment, a cushion layer 702 is disposed inside the helmet 700, the cushion layer 702 is surrounded to form a helmet cavity 701 for a head of a user to wear, the two clamping pieces clamp the cushion layer 702 oppositely, and the support 100 is mounted inside the helmet 700 (seen e.g., in FIGS. 10-11). When the user wears the helmet 700, the head of the user is placed in the helmet cavity 701, and the cushion layer 702 abuts against the head of the user so as to protect the head of the user.

The two clamping pieces include an outer side clamping piece 102 arranged deviating from the helmet cavity 701 and an inner side clamping piece 110 arranged towards the helmet cavity 701, and the inner side clamping piece 110 is sleeved with a rubber sleeve 103. In this way, when the helmet 700 is worn on the head of the user, the rubber sleeve 103 abuts against the face of the user. Because the rubber sleeve 103 has elastic deformation performance, rigid abutting is not formed on the face of the user, and the rubber sleeve 103 elastically abuts against the face of the user, thereby improving comfort used by the user.

In this embodiment, the rubber sleeve 103 is made of elastic rubber, and can be elastically deformed. When the rubber sleeve 103 is sleeved on the inner side clamping piece 110, the rubber sleeve 103 is in an elastic expansion state. The rubber sleeve 103 has a tendency of elastic contraction, and the rubber sleeve 103 is firmly fixed to the inner side clamping piece 110.

In addition, when the inner side clamping pieces 110 are clamped on the helmet 700, the friction force between the inner side clamping pieces 110 and the helmet 700 is enhanced, so that the inner side clamping pieces 110 can clamp the helmet 700 more firmly.

A plurality of elastic convex blocks 1031 are convexly arranged on a surface of the rubber sleeve 103, and the interior of the convex blocks 1031 are hollow. When the inner side clamping pieces 110 clamp the helmet 700, the convex blocks 1031 are compressed and deformed after being pressed, and the plurality of convex blocks 1031 form a multi-position abutting, so that the clamping of the inner side clamping piece 110 is more stable.

In this embodiment, the outer side clamping piece 102 is provided with a plurality of inner side grooves 1021, the inner side grooves 1021 are arranged towards the clamping area 101, the plurality of inner side grooves 1021 are arranged at intervals along a length direction of the outer side clamping piece 102, and the adjacent inner side grooves 1021 are arranged in a staggered manner.

Each inner side groove 1021 is provided with a rubber hook 1022 made of elastic rubber, one end of the rubber hook 1022 is fixed to a side wall of the inner side groove 1021, and the other end of the rubber hook 1022 is bent towards the clamping area 101 and extends into the clamping area 101; and when the outer side clamping piece 102 and the inner side clamping piece 110 clamp the helmet 700 oppositely, the rubber hook 1022 is pressed, and is reversely bent and deformed towards the inner side groove 1021, so that the rubber hook 1022 is reversely clamped to the helmet 700.

When the outer side clamping piece 102 and the inner side clamping piece 110 clamp the helmet 700, since the rubber hook 1022 extends into the clamping area 101, the rubber hook 1022 is extruded by the helmet 700 and is compressed into the inner side groove 1021. In this case, the rubber hook 1022 has an elastic force for elastically resetting towards the clamping area 101. The helmet 700 is reversely hooked through the rubber hook 1022, so that the outer side clamping piece 102 clamps the helmet 700 firmly, and during the movement, the support 100 is prevented from being disengaged from the helmet 700.

Certainly, when the outer side clamping piece 102 is disengaged from clamping of the helmet 700, under the action of the elastic force of the rubber hook 1022, the rubber hook 1022 restores deformation towards the clamping area 101.

In this embodiment, the support 100 includes a base 104 and a bottom plate 107, the bottom plate 107 is fixed to the bottom of the base 104, the bottom plate 107 and the base 104 are connected to form an integrated structure, the base 104 is connected to the frame body 200 through the above universal head 400, and the above swing interval 203 is formed between the base 104 and the frame body 200; and the two clamping pieces are respectively formed on two sides of the bottom plate 107, and the two clamping pieces are integrally formed with the bottom plate 107.

The arrangement of the universal head 400 is facilitated by arranging the base 104. The bottom plate 107 is arranged, and the two clamping pieces are formed on the bottom plate 107, so that the whole support 100 is convenient to assemble.

In this embodiment, side edge walls 109 are respectively formed on the two sides of the bottom plate 107, and the clamping piece is in butt joint with the side edge wall 109; and two recessed grooves 108 are formed on the side edge wall 109, and the two recessed grooves 108 are arranged on two sides of the clamping piece. In this way, it is convenient for the clamping pieces to be integrally formed with the bottom plate 107, the elastic deformation of the clamping pieces relative to the bottom plate 107 can be enhanced, the elastic separation deformation between the two clamping pieces is facilitated, and deformation of the clamping area 101 is enhanced, so that the two clamping pieces have wider clamping.

In this embodiment, a middle hole 500 is disposed in the middle of the base 104, and the universal head 400 is movably embedded in the middle hole 500. The universal head 400 can rotate or swing in the middle hole 500, but cannot be disengaged from the middle hole 500.

The top of the base 104 is provided with a top surface 105, the top surface 105 is arranged along the middle hole 500 in a surrounding manner, the top surface 105 is arranged obliquely downward along an extending direction of the top surface 105 from inside to outside, and the above swing interval 203 is formed between the top surface 105 and the bottom of the frame body 200.

The top surface 105 is inclined, so that the height of the swing interval 203 can be increased without increasing an interval between the bottom plate 107 and the base 104, and the mounting of the universal head 400 is not affected.

In this embodiment, the universal head 400 includes a ball head 405, the ball head 405 is convexly provided with a column body 401, the ball head 405 is movably embedded in the middle hole 500, and the ball head 405 can rotate or swing in the middle hole 500. The column body 401 is fixedly connected to the frame body 200, and when the ball head 405 rotates or swings, the frame body 200 also rotates or swings relative to the base 104 synchronously.

An upper section 402 is formed on an upper portion of the ball head 405, and a lower section 403 is formed on a lower portion of the ball head 405; and the upper section 402 abuts against an inner side wall of the middle hole 500, and a lower gap 501 is disposed between the lower section 403 and the inner side wall of the middle hole 500.

The lower section 403 and the bottom of the middle hole 500 are arranged at intervals; the elastic seat 600 is disposed between the lower section 403 and the bottom of the middle hole 500, the elastic seat 600 is pressed by the ball head 405 to be in a compression deformation state, and the ball head 405 is reversely pressed by the compressed elastic seat 600, so as to increase abutting force between the upper section 402 and the inner side wall of the middle hole 500; and the column body 401 is inserted into the frame body 200 and is fixedly connected to the frame body 200.

The column body 401 is arranged, so that the universal head 400 is fixedly connected to the frame body 200. The upper section 402 abuts against the inner side wall of the middle hole 500, and the ball head 405 is reversely pressed by the elastic seat 600, so that the abutting force between the upper section 402 and the inner side wall of the middle hole can be increased. In this way, the frame body 200 can rotate or swing stably relative to the base 104, and the shaking of the frame body 200 during the swinging or rotating process is avoided.

In addition, when the ball head 405 swings or rotates, the position of the ball head 405 can be positioned, thereby preventing the ball head 405 from shaking in the middle hole 500.

In this embodiment, in order to increase an elastic telescopic capacity of the elastic seat 600 after being compressed, both sides of the elastic seat 600 are provided with an extension section 601 extending into the lower gap 501, and the extension section 601 is disposed in the lower gap 501 and is in a natural state. In this way, in the process that the ball head 405 rotates or swings in the middle hole 500, the elastic seat 600 is movably extruded by the lower section 403, and the extension section 601 can be stored or released through the lower gap 501.

In this embodiment, a surface of the lower section 403 is provided with a plurality of groove holes 404, the plurality of groove holes 404 are arranged at intervals and distributed throughout the surface of the lower section 403, and the elastic seat 600 is pressed by the ball head 405 to be compressed and deformed, and is movably embedded in the groove holes 404. In this way, direct and more stable abutting cooperation of the lower section 403 and the elastic seat 600 can be realized, and when the ball head 405 rotates or swings, the stabilization of the position of the ball head 405 is achieved by utilizing the stable abutting between the elastic seat 600 and the lower section 403, and elastic deformation of the elastic seat 600 can be better driven by utilizing the plurality of groove holes 404.

In this embodiment, the top of the frame body 200 is recessed downward to form a recessed area 201, and an annular wall 202 arranged annularly is disposed in the recessed area 201; a magnetic plate 300 is disposed in the recessed area 201, the camera is mounted on the magnetic plate 300, the camera can be fixed on the magnetic plate 300 by means of magnetic attraction, and the annular wall 202 surrounds a periphery of the magnetic plate 300; and an annular gap 303 is disposed between the periphery of the magnetic plate 300 and the annular wall 202, a plurality of elastically deformed deformation blocks 304 are disposed in the annular gap 303, and the deformation blocks 304 are respectively in butt joint with the periphery of the magnetic plate 300 and the annular wall 202, and the deformation blocks 304 are in a compression deformation state.

In this way, the plurality of deformation blocks 304 can perform elastic limiting on the periphery of the magnetic plate 300, so as to realize transverse elastic limiting of the magnetic plate 300 at the bottom of the recessed area 201.

The recessed area 201 is convexly provided with an elastic column 301, a through hole is disposed in the middle of the magnetic plate 300, the elastic column 301 penetrates through the through hole, and the elastic column 301 abuts against an inner side wall of the through hole; and the periphery of the elastic column 301 is convexly provided with an elastic ring 302, the elastic ring 302 presses against the magnetic plate 300 from top to bottom, and the bottom of the recessed area 201 and the elastic ring 302 clamp the magnetic plate 300 oppositely, so that the magnetic plate 300 is elastically fixed in the recessed area 201.

Through elastic abutting of the elastic ring 302 against the magnetic plate 300, longitudinal elastic limiting of the magnetic plate 300 is achieved. In this way, the magnetic plate 300 can be elastically limited in both a longitudinal direction and a transverse direction in cooperation with the plurality of the deformation blocks 304. When the camera is in motion rotation, multi-direction vibration reduction of the magnetic plate 300 can be achieved, so that multi-direction vibration reduction is performed on the camera disposed on the magnetic plate 300, and the stability of the shooting process of the camera is ensured.

The foregoing descriptions are merely preferred embodiments of the present invention, but are not intended to limit the present invention. Any modification, equivalent replacement, or improvement made without departing from the spirit and principle of the present invention shall fall within the protection scope of the present invention.

What is claimed is:

1. A camera bracket, mounted inside a helmet, comprising a support connected to the helmet and a frame body for mounting a camera, wherein when the camera is mounted on the frame body, the camera is located inside the helmet;
    the support is connected to the frame body through a movably arranged universal head, the frame body rotates relative to the support by using the universal head as a rotation center, the frame body swings relative to the support by using the universal head as a swing center, a swing interval is disposed between the frame body and the support, and the swing interval limits a limit position at which the frame body swings relative to the support; and an elastic seat for positioning a position of the universal head is disposed in the support, the elastic seat abuts against the universal head, and is pressed by the universal head to be in a compressed state.

2. The camera bracket according to claim 1, wherein the support is provided with two clamping pieces that are arranged oppositely and elastically swing, a clamping area is formed between the two clamping pieces, and a width of the clamping area gradually reduces along a direction from top to bottom of the support; and the support clamps the helmet oppositely through two clamping pieces and is fixed inside the helmet.

3. The camera bracket according to claim 2, wherein a cushion layer is disposed inside the helmet, the cushion layer is surrounded to form a helmet cavity for a head of a user to wear, the two clamping pieces clamp the cushion layer oppositely, and the support is mounted inside the helmet; and the two clamping pieces comprise an outer side clamping piece arranged deviating from the helmet cavity and an inner side clamping piece arranged towards the helmet cavity, and the inner side clamping piece is sleeved with a rubber sleeve.

4. The camera bracket according to claim 3, wherein the outer side clamping piece is provided with a plurality of inner side grooves, the inner side grooves are arranged towards the clamping area, the plurality of inner side grooves are arranged at intervals along a length direction of the outer side clamping piece, and the adjacent inner side grooves are arranged in a staggered manner;
    each inner side groove is provided with a rubber hook made of elastic rubber, one end of the rubber hook is fixed to a side wall of the inner side groove, and the other end of the rubber hook is bent towards the clamping area and extends into the clamping area; and when the outer side clamping piece and the inner side clamping piece clamp the helmet oppositely, the rubber hook is pressed, and is reversely bent and deformed towards the inner side groove, so that the rubber hook is reversely clamped to the helmet.

5. The camera bracket according to claim 2, wherein the support comprises a base and a bottom plate, the bottom plate is fixed to the bottom of the base, the swing interval is formed between the base and the frame body, and the base is connected to the frame body through the universal head; and the two clamping pieces are respectively formed on two sides of the bottom plate, and the two clamping pieces are integrally formed with the bottom plate.

6. The camera bracket according to claim 5, wherein side edge walls are respectively formed on the two sides of the bottom plate, and the clamping piece is in butt joint with the side edge wall; and two recessed grooves are formed on the side edge wall, and the two recessed grooves are arranged on two sides of the clamping piece.

7. The camera bracket according to claim 5, wherein a middle hole is disposed in the middle of the base, and the universal head is movably embedded in the middle hole; and the top of the base is provided with a top surface, the top surface is arranged along the middle hole in a surrounding manner, the top surface is arranged obliquely downward along an extending direction of the top surface from inside to outside, and the swing interval is formed between the top surface and the bottom of the frame body.

8. The camera bracket according to claim 7, wherein the universal head comprises a ball head, the ball head is convexly provided with a column body, the ball head is movably embedded in the middle hole, and the column body is fixed connected to the frame body; an upper section is formed on an upper portion of the ball head, and a lower section is formed on a lower portion of the ball head; the upper section abuts against an inner side wall of the middle hole, and a lower gap is disposed between the lower section and the inner side wall of the middle hole;
    the lower section and the bottom of the middle hole are arranged at intervals; the elastic seat is disposed between the lower section and the bottom of the middle hole, the elastic seat is pressed by the ball head to be in a compression deformation state, and the ball head is reversely pressed by the compressed elastic seat, so as to increase abutting force between the upper section and the inner side wall of the middle hole; and the column body is inserted into the frame body and is fixedly connected to the frame body.

9. The camera bracket according to claim 8, wherein a surface of the lower section is provided with a plurality of groove holes, the plurality of groove holes are arranged at intervals and distributed throughout the surface of the lower section, and the elastic seat is pressed by the ball head to be compressed and deformed, and is movably embedded in the groove holes.

10. The camera bracket according to claim 1, wherein the top of the frame body is recessed downward to form a recessed area, and an annular wall arranged annularly is disposed in the recessed area; a magnetic plate is disposed in the recessed area, and the annular wall surrounds a periphery of the magnetic plate; an annular gap is disposed between the periphery of the magnetic plate and the annular wall, a plurality of elastically deformed deformation blocks are disposed in the annular gap, and the deformation blocks are respectively in butt joint with the periphery of the magnetic plate and the annular wall, and the deformation blocks are in a compression deformation state;

the recessed area is convexly provided with an elastic column, a through hole is disposed in the middle of the magnetic plate, the elastic column penetrates through the through hole, and the elastic column abuts against an inner side wall of the through hole; and the periphery of the elastic column is convexly provided with an elastic ring, the elastic ring presses against the magnetic plate from top to bottom, and the bottom of the recessed area and the elastic ring clamp the magnetic plate oppositely, so that the magnetic plate is elastically fixed in the recessed area.

\* \* \* \* \*